United States Patent
Munks et al.

(10) Patent No.: US 6,486,950 B1
(45) Date of Patent: Nov. 26, 2002

(54) MULTI-CHANNEL WAVELENGTH MONITOR

(75) Inventors: Timothy C. Munks, North Granby, CT (US); Paul Dunn, North Granby, CT (US)

(73) Assignee: JDS Uniphase Corporation, San Jose, CA (US)

( * ) Notice: Subject to any disclaimer, the term of this patent is extended or adjusted under 35 U.S.C. 154(b) by 203 days.

(21) Appl. No.: 09/729,876

(22) Filed: Dec. 5, 2000

(51) Int. Cl.⁷ .............................. G01N 21/25; G01J 3/51
(52) U.S. Cl. ...................... 356/326; 356/419; 250/226
(58) Field of Search ................................. 356/419, 328, 356/416, 319, 326, 352; 250/226, 205; 372/32, 29

(56) References Cited

U.S. PATENT DOCUMENTS

| | | | |
|---|---|---|---|
| 4,758,090 A | 7/1988 | Schuma | 356/350 |
| 4,815,081 A | 3/1989 | Mahlein et al. | 372/32 |
| 4,913,525 A | 4/1990 | Asakura et al. | 350/162.12 |
| 4,977,563 A | 12/1990 | Nakatani et al. | 372/32 |
| 5,028,918 A * | 7/1991 | Giles et al. | 119/51.02 |
| 5,068,864 A | 11/1991 | Javan | 372/32 |
| 5,166,676 A * | 11/1992 | Milheiser | 340/10.34 |
| 5,208,819 A | 5/1993 | Huber | 372/32 |
| 5,299,212 A | 3/1994 | Koch et al. | 372/32 |
| 5,323,409 A | 6/1994 | Laskoskie et al. | 372/32 |
| 5,428,700 A | 6/1995 | Hall | 372/32 |
| 5,491,471 A * | 2/1996 | Stobbe | 340/10.51 |
| 5,517,172 A * | 5/1996 | Chiu | 235/382 |
| 5,544,183 A | 8/1996 | Takeda | 372/38 |
| 5,691,989 A | 11/1997 | Rakuljic et al. | 372/20 |
| 5,706,301 A | 1/1998 | Lagerstrom | 372/32 |
| 5,754,293 A * | 5/1998 | Farhadiroushan | 356/478 |
| 5,780,843 A | 7/1998 | Cliche et al. | 250/226 |
| 5,798,859 A | 8/1998 | Colbourne et al. | 359/247 |
| 5,825,792 A | 10/1998 | Villeneuve et al. | 372/32 |
| 5,850,292 A | 12/1998 | Braun | 356/419 |
| 5,867,513 A | 2/1999 | Sato | 372/32 |
| 5,896,201 A | 4/1999 | Fukushima | 356/394 |
| 5,898,502 A | 4/1999 | Horiuchi et al. | 356/416 |
| 6,411,199 B1 * | 6/2002 | Geiszler et al. | 340/10.1 |

FOREIGN PATENT DOCUMENTS

| | | | |
|---|---|---|---|
| WO | WO 97/05679 | 2/1997 | H01S/3/13 |
| WO | WO 98/50988 | 11/1998 | H01S/3/13 |
| WO | WO 99/04466 | 1/1999 | H01S/3/133 |
| WO | WO 99/08349 | 2/1999 | H01S/3/13 |

* cited by examiner

Primary Examiner—Thien M. Le
(74) Attorney, Agent, or Firm—Kurt Rauschenbach; Rauschenbach Patent Law Group

(57) ABSTRACT

A multi-channel wavelength monitor is described that includes a dispersive element that is positioned in an optical path of an incident optical beam having a plurality of wavelengths. The dispersive element disperses the optical beam into a plurality of optical beams that simultaneously propagate in a plurality of optical paths, where each of the plurality of optical beams has one of the plurality of wavelengths. An optical filter is positioned to intercept each of the plurality of optical paths at a plurality of locations. The optical filter substantially passes a respective one of the plurality of optical beams at a respective one of the plurality of locations and substantially blocks the other optical beams. A plurality of optical detectors is positioned adjacent to the optical filter in a direction of propagation of the plurality of optical beams. A respective one of the plurality of optical detectors is positioned in a respective one of the plurality of optical paths. Each of the plurality of detectors generates an electrical signal that is proportional to an intensity of a respective one of the plurality of optical beams.

21 Claims, 10 Drawing Sheets

MULTI-CHANNEL WAVELENGTH MONITOR

FIELD OF THE INVENTION

The invention relates generally to the field of optical communications. Specifically, the invention relates to wavelength monitoring of multiple-wavelength optical signals for optical communication systems.

BACKGROUND OF THE INVENTION

Optical fiber communication systems are now widely deployed for high bandwidth telecommunication and data communication systems. Recently new communications services such as the Internet, high-speed data links, video services, and wireless services have resulted in a dramatic increase in the need for bandwidth. Data traffic is increasing at a rate of 80% per year and voice traffic is increasing at a rate of 10% per year.

Modern optical fiber communication systems have high bandwidth and low transmission loss. The bandwidth of an optical fiber determines how much information can be transmitted without losing data due to degradation in the optical signal. One way of increasing bandwidth in optical fiber communications system is to increase the number of wavelengths of light propagating in the optical fiber. Wavelength division multiplexing (WDM) is an optical technology that propagates many separate signals having different carrier wavelengths simultaneously through a single optical fiber, thus effectively increasing the aggregate bandwidth per fiber to the sum of the bit rates of each wavelength.

Dense Wavelength Division Multiplexing (DWDM) is a technology that implements WDM technology with a large number of wavelengths. DWDM is typically used to describe WDM technology that propagates more than 40 wavelengths in a single optical fiber. Bandwidths greater than 1 terabits/sec have been demonstrated in DWDM based communication systems.

Each wavelength bandwidth in a WDM system occupies a certain channel spacing in the communication system. As the number of wavelengths increases, the channel width and channel spacing decreases. The more closely spaced the carrier wavelengths, the more channels that can be propagated simultaneously and the higher the aggregate bandwidth. As the spacing between the wavelengths becomes smaller, the probability of cross talk between channels increases. This cross talk is undesirable because data from one channel interferes with data from another channel, thereby causing erroneous data to be propagated in the communication system and ultimately corrupting the data at the receiver.

In order to maximize the number of available channels in a WDM communication system, each laser source must generate an optical beam having a relatively stable wavelength. The lasers used for WDM transmitters generally emit light at a stable wavelength and the wavelength can be precisely controlled. However, many laser sources experience wavelength drift over time caused by temperature, aging, and modal instability. Wavelength drift can cause cross talk and result in a loss of data in WDM communication systems and, therefore, must be monitored and compensated.

Wavelength monitoring of the channel signals can detect drifts in the predefined channel wavelengths and can verify that channel signals added to the multiple wavelength light are within acceptable wavelength deviations of the predefined channel wavelengths. One prior art method of wavelength monitoring is to use multiple wavelength meters to monitor the wavelength of channel signals. These meters are physically large and, consequently, are difficult to integrate into most WDM optical communication systems.

Another prior art method of wavelength monitoring uses optical spectrum analyzers. Many prior art optical spectrum analyzers use rotating gratings and/or optical filters. These systems are also physically large and, consequently, are difficult to integrate into most WDM optical communication systems. Other prior art optical spectrum analyzers use InGaAs/InP photodetector arrays, but these spectrum analyzers are very expensive and, consequently, are not practical in integrate into most WDM optical communication systems.

U.S. Pat. No. 5,850,292 describes a prior art wavelength monitor for optical signals. In this prior-art monitor, an incident multi-wavelength signal is cascaded along a multi-point travel path in a zigzag pattern though an optically transmissive member. The multi-wavelength signal is incident on a series of wavelength discriminators arranged on the optically transmissive member. The wavelength discriminators can be implemented with a filter, such as a Fabry Perot filter. Each of the wavelength discriminators is selectively transmissive to light signals within a predetermined wavelength range containing a predetermined one of the channel signals. The wavelength discriminators are reflective to the remaining components channel signals within the multi-wavelength light signal. Each selectively transmitted channel signal is then intercepted by a detector, which produces an output current that is mapped to corresponding signal wavelengths.

SUMMARY OF THE INVENTION

The present invention relates to wavelength monitoring of multiple-wavelength optical signals propagating in an optical communication system. It is an object of the invention to provide a multi-channel wavelength monitor that is relatively inexpensive to manufacture and that can be easily integrated into optical fiber communication systems, such as DWDM communication systems. It is another object of the invention to provide a multi-channel wavelength monitor that uses a single optical filter. It is another object of the invention to provide simultaneous or parallel multi-channel wavelength monitoring. It is yet another object of the invention to provide a multi-channel wavelength that use differential detection methods to produce high wavelength resolution.

The present invention has numerous advantages over prior art multi-channel wavelength monitors. One advantage of the multi-channel wavelength monitor of the present invention is that it substantially simultaneously measures the intensity of each channel in the multi-wavelength optical beam. That is, the channels are monitored in parallel. One application of the multi-channel wavelength monitor of the present invention is high-speed parallel wavelength monitoring of many ITU channels in a DWM optical communication system. Another advantage of the multi-channel wavelength monitor of the present invention is that it uses a single optical filter to discriminate wavelength bands or channels and, therefore, is more compact and simpler to manufacture.

Accordingly, the present invention features a multi-channel wavelength monitor that, in one embodiment, substantially simultaneously monitors a plurality of optical channels. The monitor includes a dispersive element that is positioned in an optical path of an incident optical beam having a plurality of wavelengths. The dispersive element disperses the optical beam into a plurality of optical beams that simultaneously propagate in a plurality of optical paths, where each of the plurality of optical beams has one of the plurality of wavelengths. In one embodiment, the dispersive element includes an optical beam-shaping element.

An optical filter is positioned to intercept each of the plurality of optical paths at a plurality of locations. In one embodiment, a substantially transparent substrate is positioned between the dispersive element and the filter. At least one of an incident surface and an exit surface of the substrate may be anti-reflection coated. In one embodiment, the dispersive element and the optical filter are one optical element.

The optical filter substantially passes a respective one of the plurality of optical beams at a respective one of the plurality of locations and substantially blocks the other optical beams. The optical filter may be a thin film filter, such as a multi-cavity thin film filter. In one embodiment, the optical filter exhibits a spectral response that is dependent upon an incident angle at which each of the optical paths enter the optical filter. In another embodiment, the optical filter comprises a plurality of optical filters.

A plurality of optical detectors is positioned adjacent to the optical filter in a direction of propagation of the plurality of optical beams. A respective one of the plurality of optical detectors is positioned in a respective one of the plurality of optical paths. A respective one of the plurality of detectors generates an electrical signal that is proportional to an intensity of a respective one of the plurality of optical beams. In one embodiment, the detector comprises a photodiode array. The photodiode array may be periodically spaced or may be non-periodically spaced.

The present invention also features another multi-channel wavelength monitor that, in one embodiment, substantially simultaneously monitors a plurality of optical channels. The monitor includes a dispersive element that is positioned in an optical path of an incident optical beam having a plurality of wavelengths. The dispersive element disperses the optical beam into a plurality of optical beams that simultaneously propagates in a plurality of optical paths, where each of the plurality of optical beams has one of the plurality of wavelengths. In one embodiment, the dispersive element includes an optical beam-shaping element.

The monitor includes a plurality of optical filters where a respective one of the plurality of optical filters is positioned to intercept a respective one of the plurality of optical paths. A respective one of the plurality of optical filters substantially passes a respective one of the plurality of optical beams and substantially blocks each of the other optical beams. In one embodiment, the optical filters are thin film optical filters.

A plurality of optical detectors is positioned adjacent to the optical filter in a direction of propagation of the plurality of optical beams. A respective one of the plurality of optical detectors is positioned in a respective one of the plurality of optical paths. Each of the plurality of detectors generates an electrical signal that is proportional to an intensity of a respective one of the plurality of optical beams. In one embodiment, the detector comprises a photodiode array. The photodiode array may be periodically spaced or may be non-periodically spaced.

The present invention also features a method for simultaneously monitoring multiple wavelengths in a multi-channel optical beam. The method includes dispersing an optical beam into a plurality of optical beams that propagate in a plurality of optical paths, where each of the plurality of optical beams has one of a plurality of wavelengths. The plurality of optical beams is then transmitted through an optical filter. A respective one of a plurality of locations in the optical filter substantially transmits a respective one of the optical beams having a respective one of the plurality of wavelengths and substantially rejects other optical beams.

Each of the plurality of transmitted optical beams is simultaneously detected and a plurality of electrical signals is generated. A respective one of the plurality of electrical signals corresponds to an intensity of a respective one of the plurality of optical beams. The electrical signals are used to characterize the channels of the multi-channel optical beam. For example, the electrical signals can be used to determine the power in each channel of the optical beam. The transmitted optical beams may be detected by differentially detection.

BRIEF DESCRIPTION OF THE DRAWINGS

This invention is described with particularity in the appended claims. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
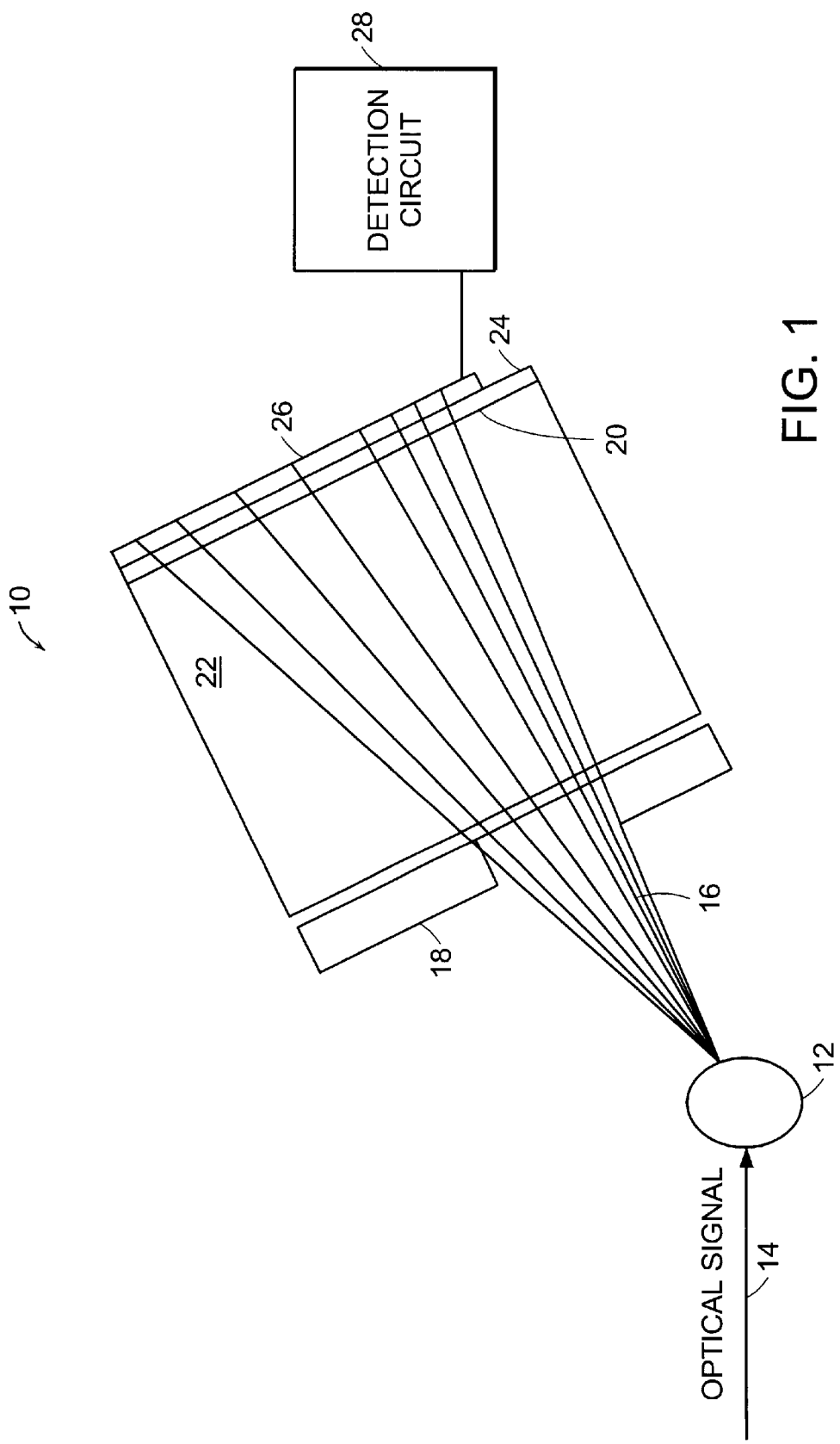
FIG. 1 illustrates a block diagram of one embodiment of the multi-channel wavelength monitor of the present invention.

FIG. 1 illustrates a block diagran of one embodiment of the multi-channel wavelength monitor 10 of the present invention. The monitor 10 includes an optical beam shaping element 12 that receives a multi-channel optical signal 14. By multichannel optical signal, we mean an optical signal having multiple wavelength bands or channels. The beam shaping element 12 generates a plurality of optical beams 16. Each of the optical beams have a different wavelength band or channel and propagate away from the beam shaping element 12 in a unique optical path having a unique propagation angle relative to the beam shaping element 12. In one embodiment, the beam shaping element 12 includes a prism and the propagation angle is dependent upon the wavelength of the optical beam.

An aperture 18 passes the plurality of optical beams 16 propagating from the beam shaping element 12 that are within a predetermine solid angle. A shaped surface 20 is positioned proximate to the aperture 18 in the path of the plurality of optical beams 16. In one embodiment, the shaped surface 20 is wedge shaped.

An optically transparent substrate 22 is positioned after the aperture 18 in the direction of propagation. The substrate 22 may be anti-reflection coated on at least one surface to minimize unwanted reflections, which may cause the detection of erroneous signals. Other embodiments do not include the substrate and free space separates the aperture 18 and the shaped surface 20.

A filter 24 is positioned proximate to the shaped surface 20. Numerous types of filters can be used in the multi-channel wavelength monitor of the present invention. For example, the filter 24 may be a dielectric thin film filter, such as a multi-cavity dielectric thin film filter. The filter 24 may be a single filter or may be a plurality of individual filters. In one embodiment, the filter 24 is one single filter that has a spectral transmittance characteristic that is a function of the incident angle at which the optical beam enters the filter.

The filter 24 may have numerous filter characteristics. Examples of possible filter characteristics are described in connection with FIG. 2a and FIG. 2b. For example, the filter 24 may be a multi-cavity thin film bandpass filter, as described in connection with FIG. 2a, that passes optical radiation within a certain bandwidth. In this embodiment, the filter 24 substantially transmits optical radiation in a certain bandwidth and substantially rejects all other optical radiation. The filter 24 may also be a multi-cavity thin film narrowband filter, as described in connection with FIG. 2b.

In one embodiment, the filter 24 is integrated with the shaped surface 20. For example, the filter 24 can be a multi-cavity dielectric thin film filter that is deposited directly on the shaped surface 20. Such a filter comprises alternating layers of high refractive index and low refractive index materials, where each layer is a quarter-wavelength thick. In another embodiment, a multi-cavity thin film filter is attached directly to the shaped surface 20 with an optically transparent material.

A plurality of detector 26 is positioned proximate to the filter 24. In one embodiment, the plurality of detectors 26 is a plurality of discrete detectors. In another embodiment, the plurality of detectors 26 is an array of detector, such as a photodiode array. One advantage of the multi-channel wavelength monitor of the present invention is that the plurality of detectors 26 can be an array of photodiode detectors that are fabricated on a monolithic substrate. Such a detector array is relatively inexpensive to fabricate and can be fabricated to very precise dimensions.

The spacing of each of the plurality of detectors 26 may be linear or non-linear. In one embodiment, the spacing of each of the plurality of detectors 26 is non-linear and is proportional to the inverse cosine of an angle relative to the beam shaping element 12. In another embodiment, the spacing of each of the plurality of detectors is non-linear and compensates for the non-linear peak transmittance of filter.

A respective one of the plurality of optical beams 16 strikes a respective one of the plurality of detector 26 and generates an electrical signal that is proportional to an intensity of the optical signal within a respective wavelength band or channel. Each of the plurality of optical-beams 16 is detected at a substantially simultaneous time. Thus, the intensity of each channel of the multi-wavelength optical beam is substantially measured in parallel.

A detection circuit 28 is coupled to the output of the plurality of detectors 26. The detection circuit 28 processes the signals generated by the plurality of detectors 26 and then generates indication and/or control signals for the multi-channel wavelength monitor 10. In one embodiment, the detection circuit 28 uses differential detection to increase the wavelength resolution, as described in connection with FIG. 3 and FIG. 4. Using differential detection, very small changes in wavelength can be detected and used for monitoring and control purposes.

In operation, the multi-channel wavelength monitor 10 simultaneously monitors multiple wavelengths in a multi-channel optical beam 14. The optical beam 14 is dispersed by the beam shaping element 12 into a plurality of optical beams 16 that propagate in a plurality of optical paths. Each of the plurality of optical beams 16 has one of a plurality of wavelengths. A plurality of optical beams 16 within a predetermined solid angle is then transmitted through the aperture 18 and through the optically transparent substrate 22.

The plurality of optical beams pass though the shaped surface 20 and strike the filter 24 at a plurality of locations with a plurality of angles of incidence. The filtered portion of a respective one of the plurality of optical beams strikes a respective one of the plurality of detector 26 and generates an electrical signal that is proportional to an intensity of a respective channel.

Each of the plurality of transmitted optical beams is simultaneously detected and a plurality of electrical signals is generated. A respective one of the plurality of electrical signals corresponds to an intensity of a respective one of the plurality of optical beams. The electrical signals are used to characterize the channels of the multi-channel optical beam.

Figure 2A:
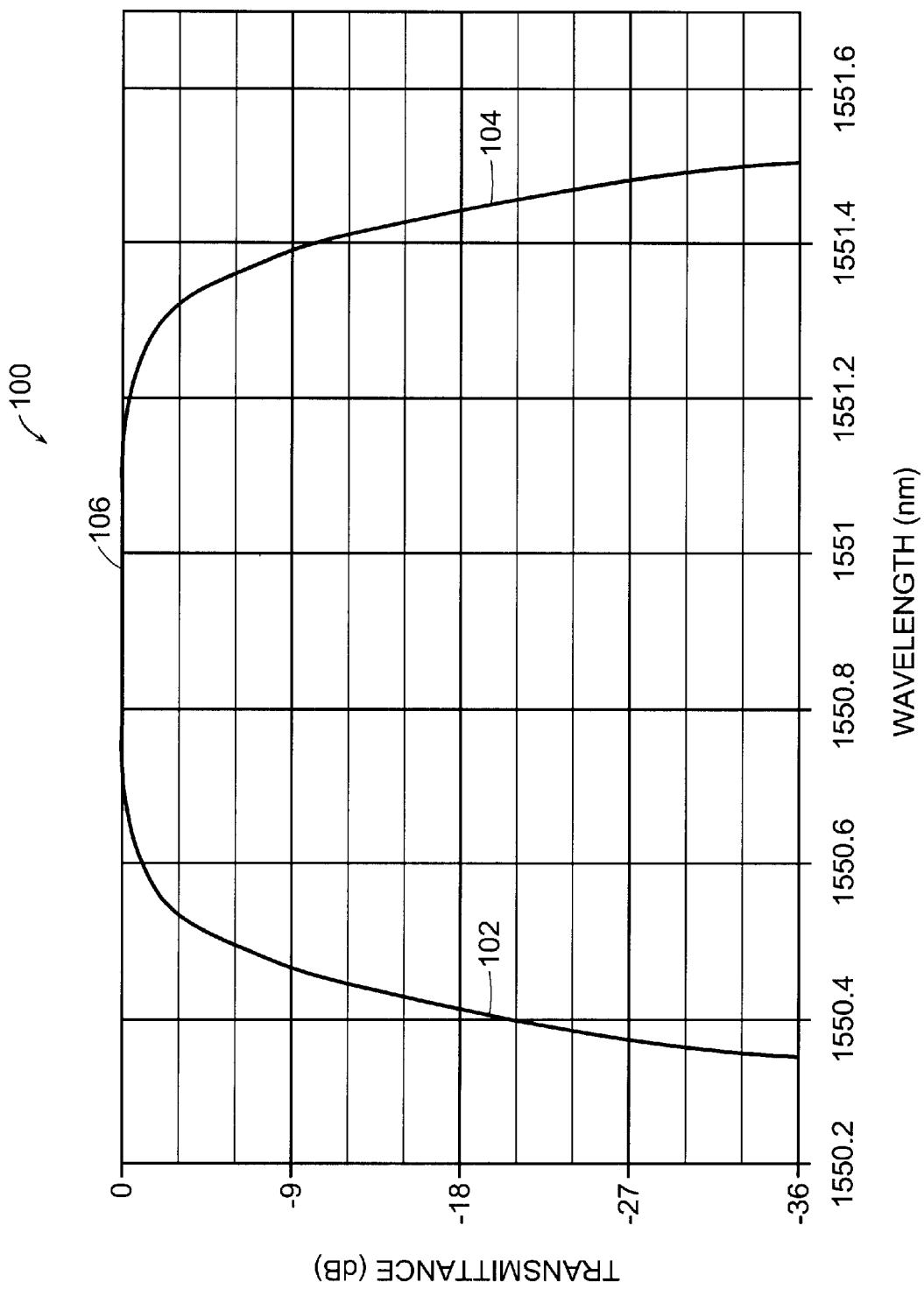
FIG. 2a illustrates a graph of spectral transmittance as a function of wavelength for a multi-cavity thin film bandpass filter that can be used with the multi-channel wavelength monitor of the present invention.

FIG. 2a illustrates a graph of spectral transmittance 100 as a function of wavelength for a multi-cavity thin film bandpass filter that can be used with the multichannel wavelength monitor of the present invention. The spectral transmittance 100 of this bandpass filter has a relatively high discrimination slope at cut-on 102 and cut-off 104. The spectral transmittance 100 is relatively flat in the spectral passband 106 of the filter 24.

A multi-channel monitor of the present invention using a bandpass filter having the spectral transmittance characteristic illustrated in FIG. 2a is useful for monitoring the optical power of an individual channel of a multi-channel optical signal. In pure monitoring applications, the flat central section of the spectral passband 106 is used. The bandpass filter is typically used for wavelength monitoring applications that do not require high wavelength resolution.

Figure 2B:
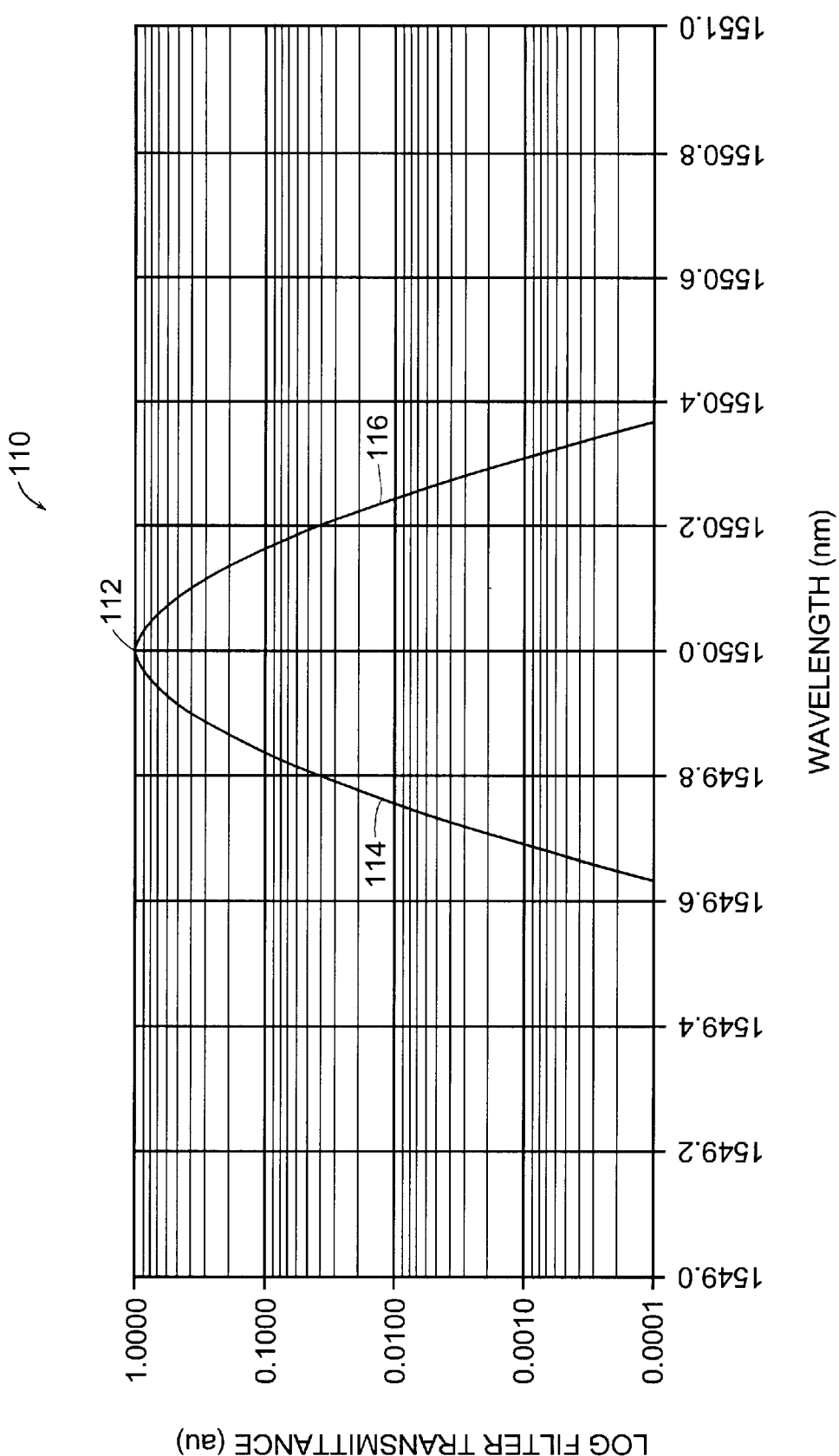
FIG. 2b illustrates a graph of spectral transmittance as a function of wavelength for a multi-cavity thin film narrow bandpass filter that can be used with the multi-channel wavelength monitor of the present invention in applications requiring high wavelength resolution.

FIG. 2b illustrates a graph of spectral transmittance 110 as a function of wavelength for a multi-cavity thin film narrow bandpass filter that can be used with the multi-channel wavelength monitor of the present invention in applications requiring high wavelength resolution. The bandwidth of the spectral transmittance 110 of the narrowband filter is relatively narrow compared with the bandwidth of the spectral transmittance 100 of the bandpass filter of FIG. 2a. In addition the spectral transmittance 110 of the narrowband filter has a relatively non-flat passband 112 compared with the spectral transmittance 100 of the bandpass filter of FIG. 2a.

A filter 24 having the spectral transmittance 110 illustrated in FIG. 2b can be used in the monitor of the present invention in several ways. In one embodiment, the monitor uses the central portion of the filter. In this embodiment, the passband 112 of the filter is chosen to be proportional to the channel bandwidth. In other embodiments, the monitor uses either the cut-on 114 or the cut-off 116 portion of the spectral transmittance.

As channel density increases, the required bandwidth of the filters must decrease in order to keep channel cross talk within acceptable limits. Consequently, the number of layers in the multi-layer thin film filter needed to achieve the required bandwidth increases. Increasing the number of layers increases the complexity and cost of manufacturing the multi-channel wavelength monitor. In one embodiment of the present invention, the multi-channel wavelength monitor uses differential detection to achieve very high wavelength or frequency resolution while keeping the number of layers in the multi-layer thin film filter relatively low. In this embodiment, the detection circuit 28 processes electrical signals generated by two or more detectors 26 to determine the intensity of an optical beam propagating in a single channel.

Figure 3:
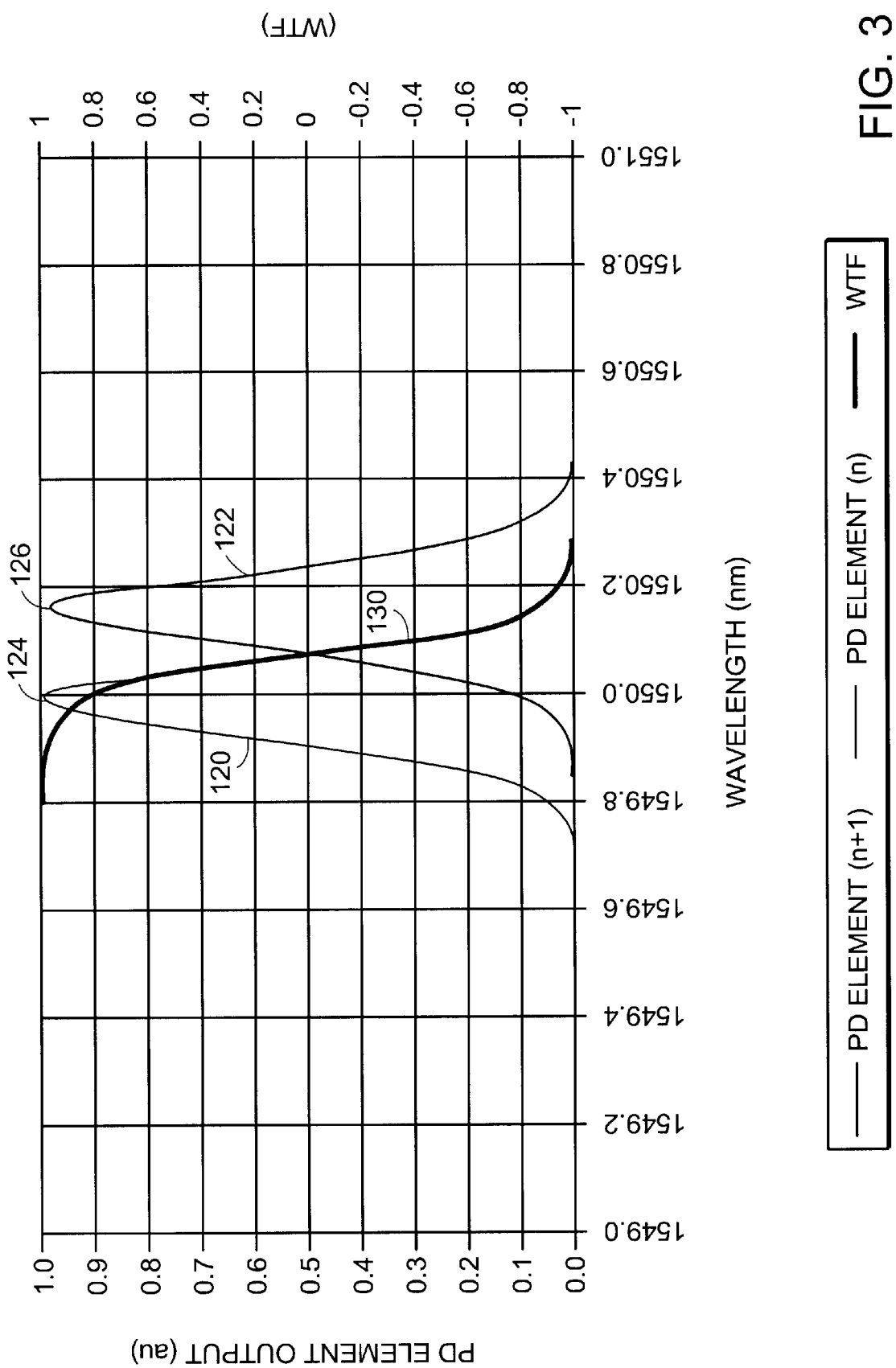
FIG. 3 illustrates a graph of the response characteristics of two detectors configured for differential detection with the multi-channel monitor of the present invention.

FIG. 3 illustrates a graph of the response characteristics of two detectors configured for differential detection with the multi-channel monitor of the present invention. The graph of a first 120 and second spectral transmittance characteristic 122 as a function of wavelength, is shown for a first and second detector, respectively. The first 120 and second spectral transmittance characteristic 122 have a first 124 and a second transmission peak 126, respectively.

The multi-channel wavelength monitor of the present invention may use differential detection. In one embodiment, the wavelength corresponding to the first 124 and second transmission peak 126 are chosen so that the wavelength to be monitored is positioned between the first 124 and second transmission peak 126. The detection circuit 28 sums the magnitude of the electrical signals generated by two detectors. FIG. 3 illustrates the resulting wavelength transfer function 130. The wavelength discriminator slope of the wavelength transfer function 130 is approximately −12.7/nm. The range of the wavelength transfer function is from 10% to 90% over 0.2 nm. The multi-channel wavelength monitor using this differential detection circuit can be used to monitor a DWDM communication signal with a 50 GHz DWDM spacing.

Figure 4:
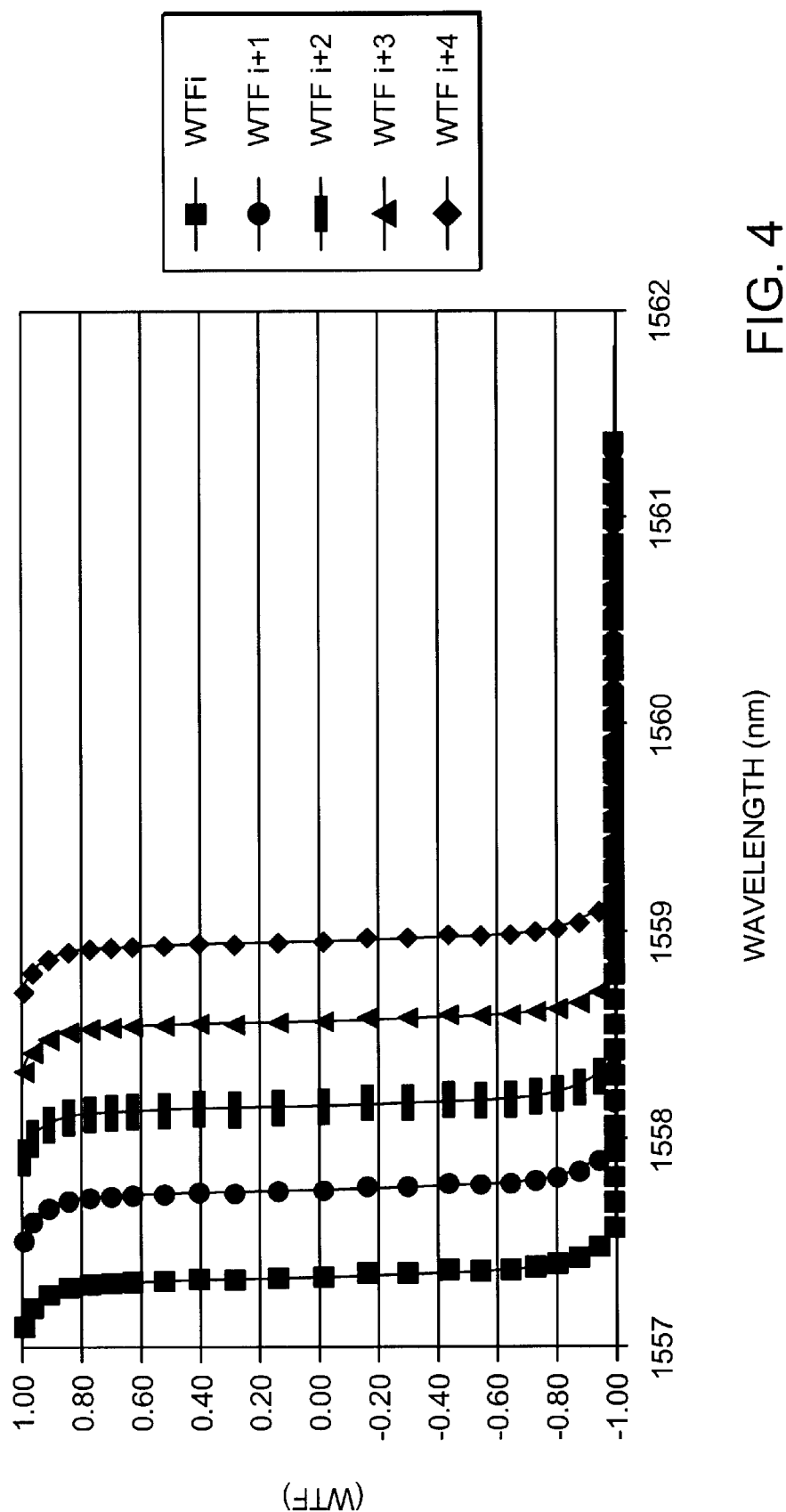
FIG. 4 illustrates a graph of the wavelength transfer function for five detectors configured for differential detection with the multi-channel monitor of the present invention.

FIG. 4 illustrates a graph of the wavelength transfer function for five detectors configured for differential detection with the multi-channel monitor of the present invention. The multi-channel wavelength monitor using this detection circuit can be used to monitor a DWDM communication signal with a 50 GHz DWDM spacing. The resulting channel cross talk is approximately −27 dB.

One advantage of the multi-channel wavelength monitor of the present invention is that a single multi-cavity thin film filter can be used to discriminate multi-wavelength bands. Using a single filter to discriminate multi-wavelength bands greatly reduces the complexity and the cost to manufacture the monitor when compared to monitors having a plurality of individual detectors. Using a single filter may also make the monitor more compact.

The spectral transmittance of a multi-cavity thin film filter is dependent upon the optical path length of the optical beam propagating though the filter. The optical path length of the optical beam is a function of the angle of incidence of the optical beam. A normal angle of incidence has the shortest optical path length. As the angle of incidence diverges from the normal angle, the optical path length increases.

Figure 5:
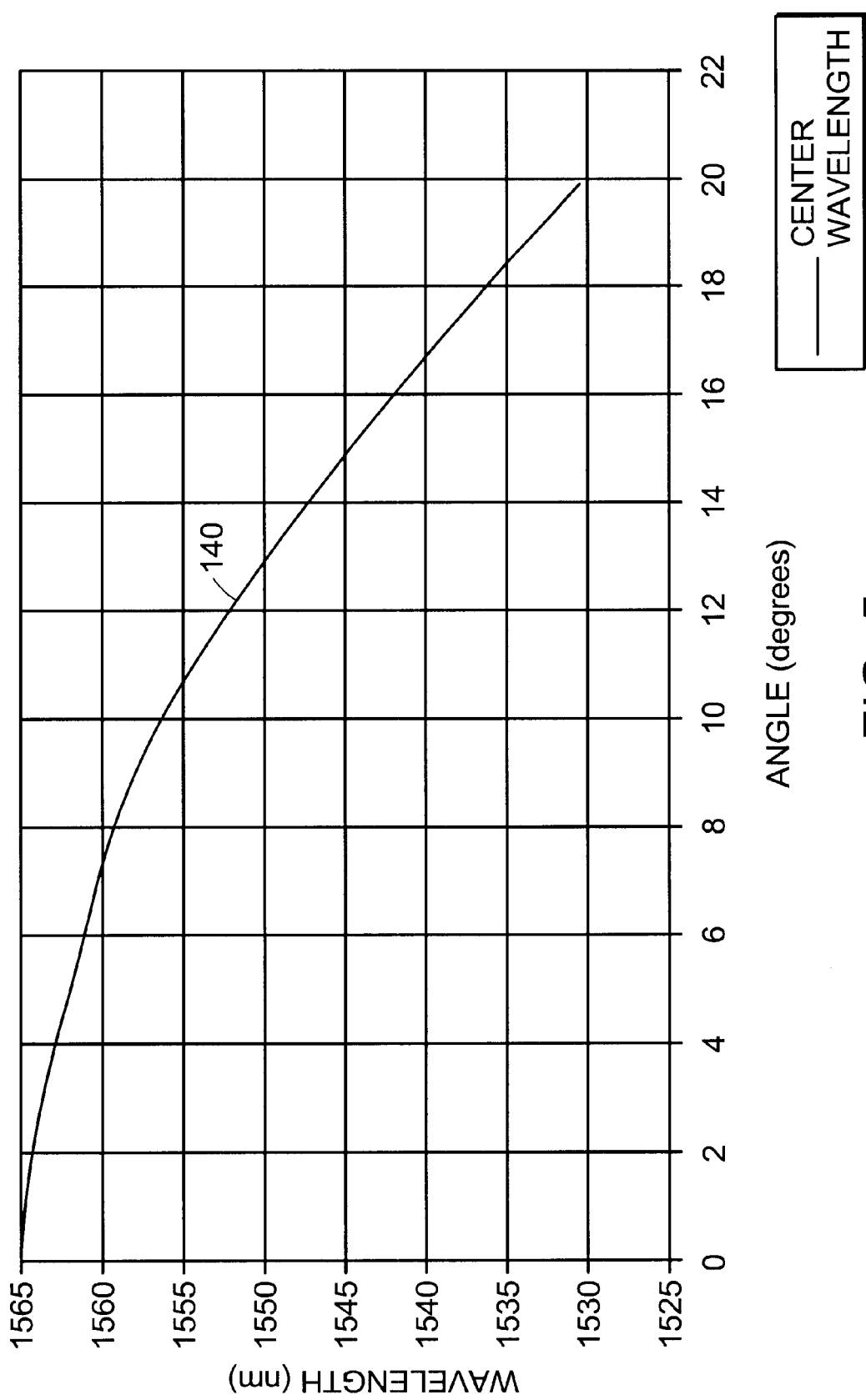
FIG. 5 is a graph of the peak spectral transmittance wavelength of a multi-cavity thin film filter as a function of angle of incidence for a multi-cavity thin film filter.

The spectral transmittance characteristics of multi-cavity thin film filters as a function of angle of incidence are well known in the art and relatively easy to calculate. FIG. 5 is a graph of the peak spectral transmittance wavelength 140 of a multi-cavity thin film filter as a function of angle of incidence for a multi-cavity thin film filter. The peak spectral transmittance wavelength is the center wavelength of the filter. That is, the wavelength with the highest transmittance. The peak transmittance wavelength decreases in proportion to the cosine of the angle of incidence.

Figure 6:
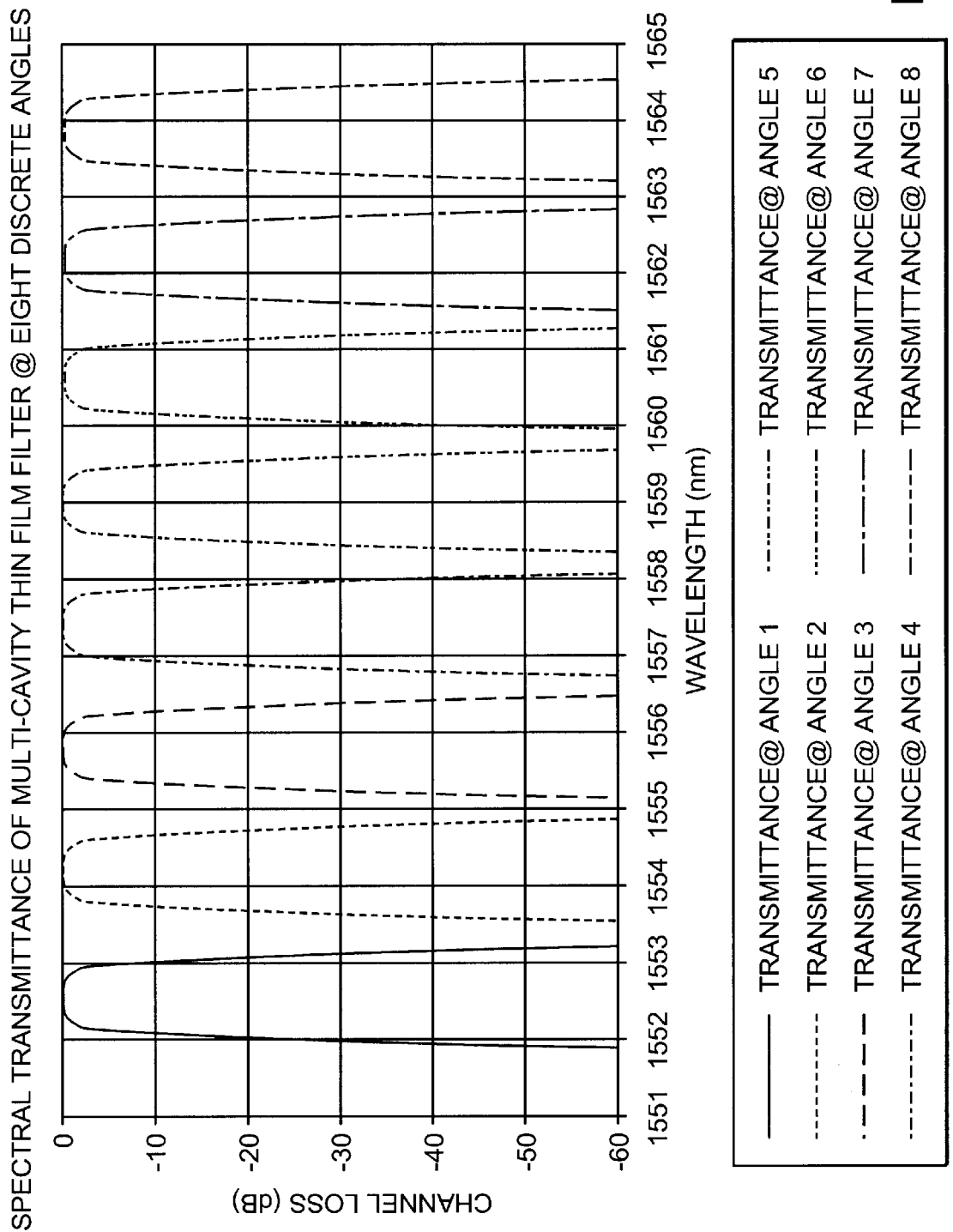
FIG. 6 is a graph of spectral transmittance of a multi-cavity thin film filter for the multi-channel wavelength monitor of the present invention as a function of angle of incidence for eight discrete angles of incidence.

FIG. 6 is a graph of spectral transmittance of a multi-cavity thin film filter for the multi-channel wavelength monitor of the present invention as a function of angle of incidence for eight discrete angles of incidence. The spectral transmittance for each of the eight discrete angles is a bandpass filter characteristic. The center frequency of the bandpass filter characteristic is a function of the angle of incidence. Thus, a single multicavity thin film filter can produce a plurality of bandpass filter characteristic at a plurality of center frequencies depending upon the angle of incidence.

The multi-channel wavelength monitor 10 of the present invention can be constructed using a multi-cavity thin film filter 24 having the spectral transmittance characteristics shown in FIG. 6. The multi-cavity thin film filter 24 is positioned relative to the beam shaping element 12 so that the plurality of beams propagating from the beam shaping element 12 intercepts the thin film filter 24 at a plurality of locations with a plurality of angles of incidence.

A respective one of the plurality of beams 16 propagating from the beam shaping element 12 is filtered by the multi-cavity thin film filter 24 with a bandpass filter characteristic having a center frequency that is dependent upon a respective one of the plurality of angles of incidence. A respective one of the plurality of detectors 26 detects the light transmitted though the filter 24 at a respective one of the plurality of locations.

The multi-channel wavelength monitor 10 of the present invention can be designed to monitor specific frequencies or wavelengths. There are several design parameters that can be chosen to determine the frequencies to be monitored. These design parameters include the physical characteristics of the beam shaping element 12, the physical structure of the multi-cavity thin film 24, and the relative position of the beam shaping element 12 and the multi-cavity thin film filter 24. Useful data for the multi-cavity thin film filter 24 includes data of peak wavelength as a function of angle of incidence, the angle of incidence as a function of wavelength change, and detector spacing as a function of wavelength change. Exemplary graphs of these data are illustrated in FIGS. 7 though FIG. 9.

Figure 7:
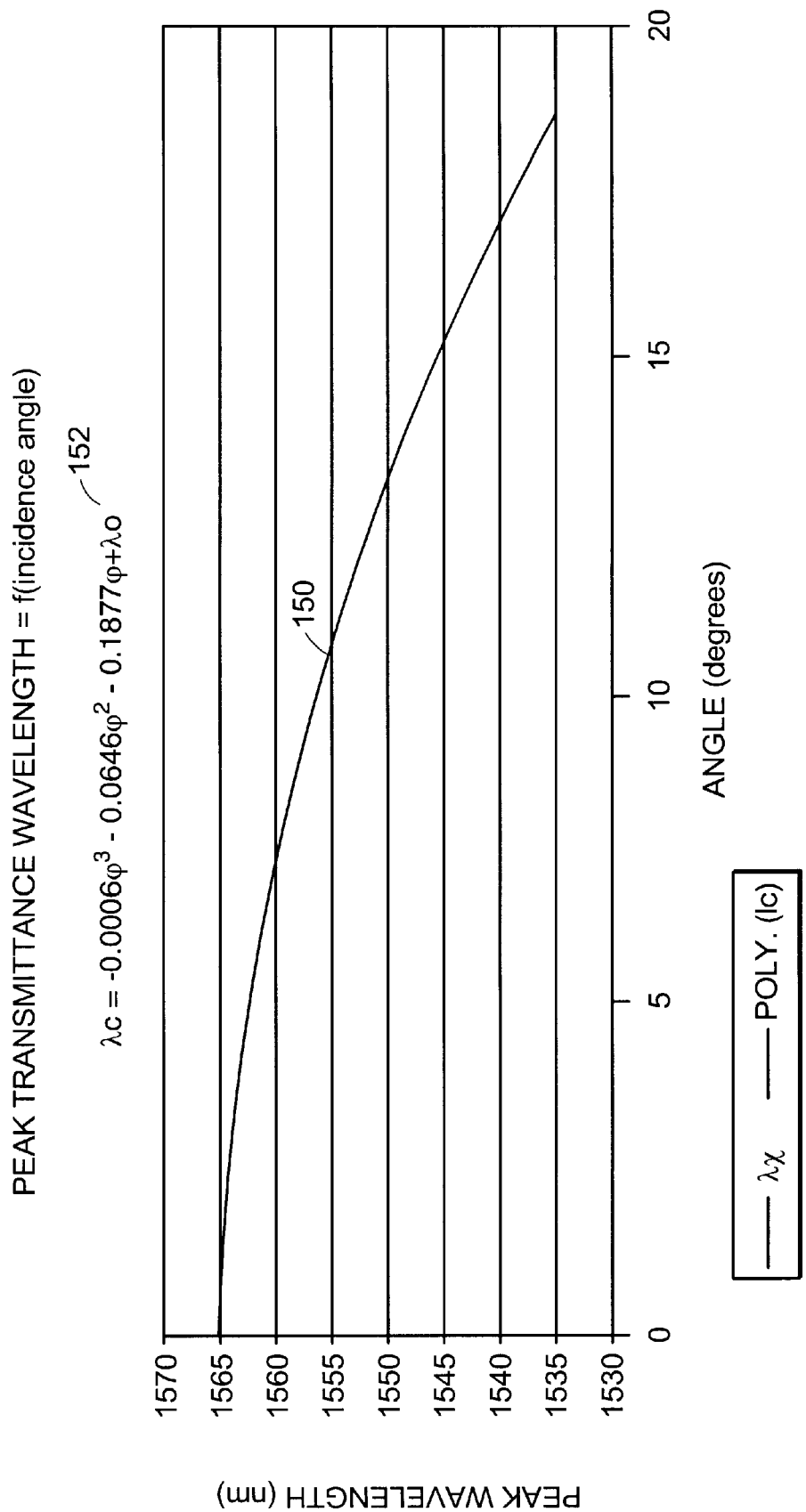
FIG. 7 is a graph of empirical data of peak wavelength as a function of angle of incidence of a multi-cavity thin film filter for the multi-channel wavelength monitor of the present invention.

FIG. 7 is a graph of empirical data of peak wavelength 150 as a function of angle of incidence of a multi-cavity thin film filter 24 for the multi-channel wavelength monitor 10 of the present invention. A polynomial 152 is fit to the experimental data for spectral transmittance as a function of angle of incidence. The resulting data can be used to select the physical characteristics of the beam shaping element 12 and the position of the beam shaping element 12 relative to the filter 24 so that the beam divergence of each of the plurality of beams results in incident angles that produce the desired peak wavelength of the filter at the plurality of locations on the filter.

Figure 8:
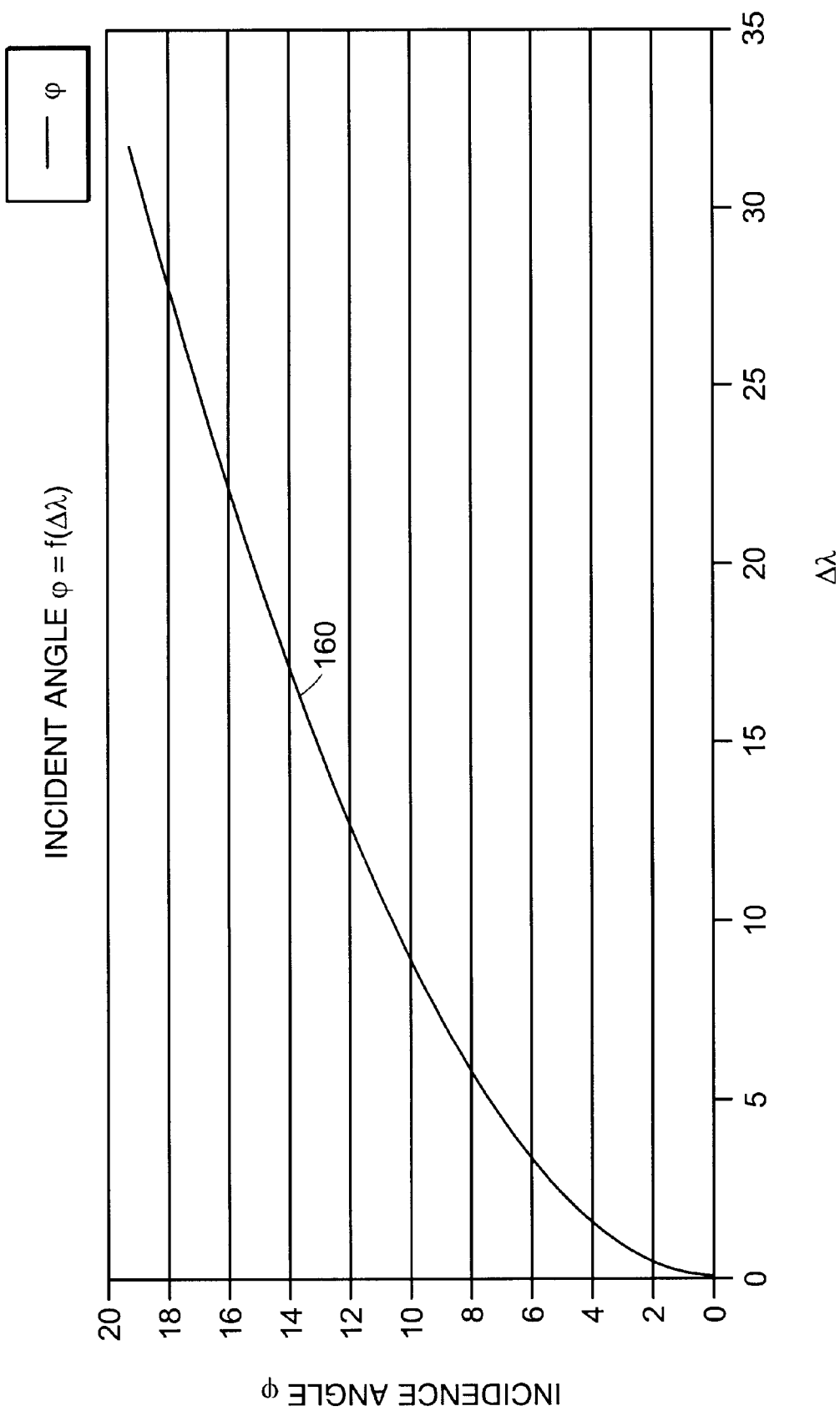
FIG. 8 is a graph of the angle of incidence as a function of wavelength change of a multi-cavity thin film filter for the multi-channel wavelength monitor of the present invention.

FIG. 8 is a graph of the angle of incidence 160 as a function of wavelength change of a multi-cavity thin film filter 24 for the multi-channel wavelength monitor 10 of the present invention. The resulting data can be used to select the physical characteristics of the beam shaping element 12 and the position of the beam shaping element 12 relative to the filter 24 so that the beam divergence of each of the plurality of beams results in incident angles that produce the desired wavelength change at the plurality locations on the filter.

Figure 9:
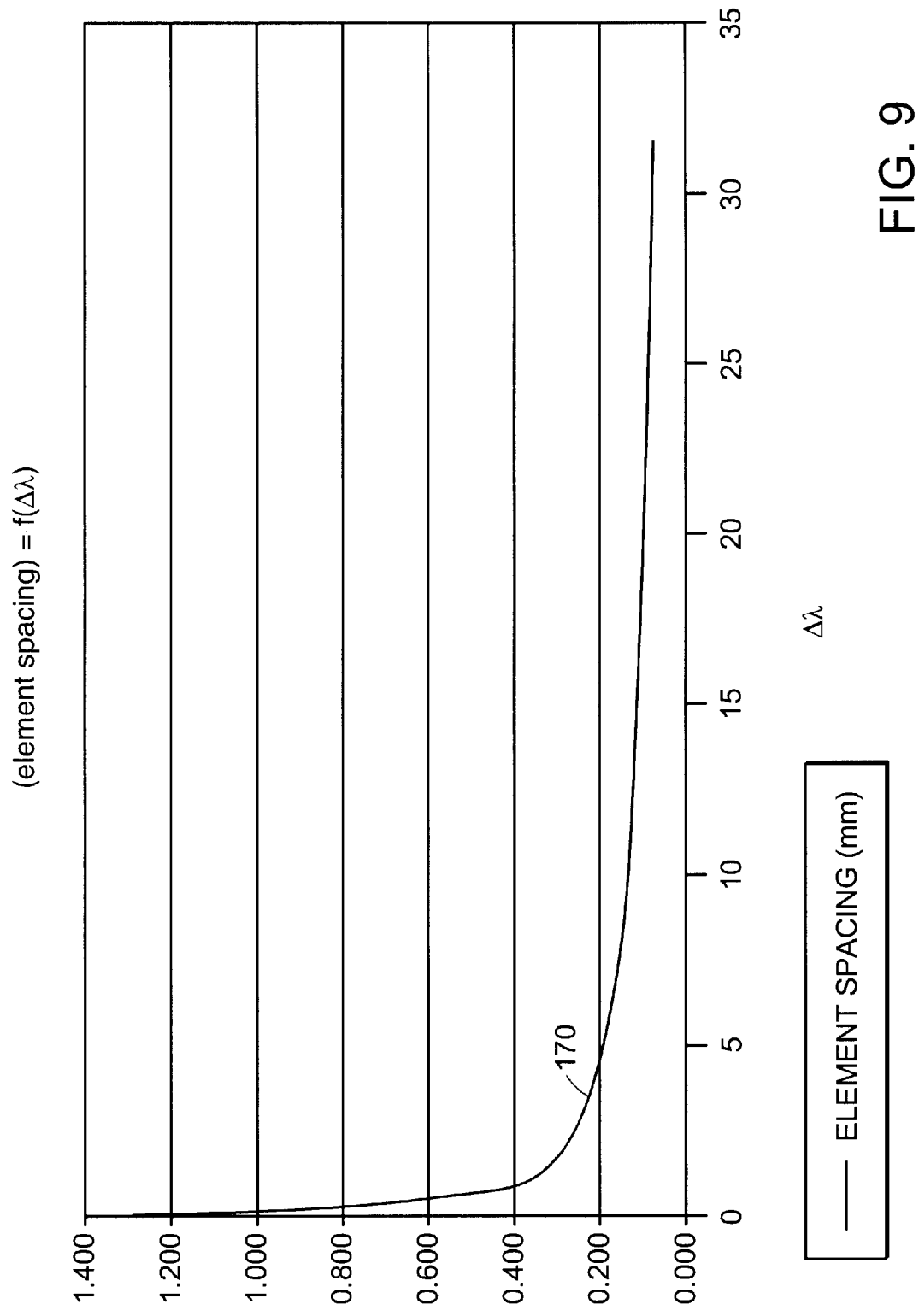
FIG. 9 is a graph of detector spacing as a function of wavelength change of a multi-cavity thin film filter for the multi-channel wavelength monitor of the present invention.

FIG. 9 is a graph of detector spacing 170 as a function of wavelength change of a multi-cavity thin film filter for the multi-channel wavelength monitor of the present invention. The resulting data can be used to select the detector spacing for a desired change in monitored wavelength.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A multi-channel wavelength monitor comprising:
   a) a dispersive element that is positioned in an optical path of an incident optical beam having a plurality of wavelengths, the dispersive element dispersing the optical beam into a plurality of optical beams propagating in a plurality of optical paths, wherein each of the plurality of optical beams has one of the plurality of wavelengths;
   b) an optical filter that is positioned to intercept each of the plurality of optical paths at a plurality of locations, the optical filter substantially passing a respective one of the plurality of optical beams at a respective one of the plurality of locations and substantially blocking the other optical beams, and
   c) a plurality of optical detectors that are positioned adjacent to the optical filter in a direction of propagation of the plurality of optical beams, a respective one of the plurality of optical detectors being positioned in a respective one of the plurality of optical paths, wherein each of the plurality of detectors generates an electrical signal that is proportional to an intensity of a respective one of the plurality of optical beams.

2. The multi-channel wavelength monitor of claim 1 wherein the dispersive element comprises an optical beam-shaping element.

3. The multi-channel wavelength monitor of claim 1 wherein the plurality of optical beams are monitored substantially simultaneously.

4. The multi-channel wavelength monitor of claim 1 wherein the optical filter has a spectral response that is dependent upon an incident angle at which each of the optical paths enter the optical filter.

5. The multi-channel wavelength monitor of claim 1 wherein the optical filter comprises a thin film filter.

6. The multi-channel wavelength monitor of claim 5 wherein the thin film filter comprises a multi-cavity thin film filter.

7. The multi-channel wavelength monitor of claim 1 wherein the optical filter comprises a plurality of optical filters.

8. The multi-channel wavelength monitor of claim 1 wherein the detector comprises a photodiode array.

9. The multi-channel wavelength monitor of claim 1 wherein the photodiode array is periodically spaced.

10. The multi-channel wavelength monitor of claim 1 wherein the dispersive element and the optical filter comprise one optical element.

11. The multi-channel wavelength monitor of claim 1 further comprising a substantially transparent substrate positioned between the dispersive element and the filter.

12. The multi-channel wavelength monitor of claim 11 wherein at least one of an incident surface and an exit surface of the substrate is anti-reflection coated.

13. A multi-channel wavelength monitor comprising:
   a) a dispersive element that is positioned in an optical path of an incident optical beam having a plurality of wavelengths, the dispersive element dispersing the optical beam into a plurality of optical beams propagating in a plurality of optical paths, wherein each of the plurality of optical beams has one of the plurality of wavelengths;
   b) a plurality of optical filters, a respective one of the plurality of optical filters being positioned to intercept a respective one of the plurality of optical paths, a respective one of the plurality of optical filters substantially passing a respective one of the plurality of optical beams and substantially blocking each of the other optical beams; and
   c) a plurality of optical detectors that are positioned adjacent to the optical filter in a direction of propagation of the plurality of optical beams, a respective one of the plurality of optical detectors being positioned in a respective one of the plurality of optical paths, wherein each of the plurality of detectors generates an electrical signal that is proportional to an intensity of a respective one of the plurality of optical beams.

14. The multi-channel wavelength monitor of claim 13 wherein the dispersive element comprises an optical beam-shaping element.

15. The multi-channel wavelength monitor of claim 13 wherein the plurality of optical beams are monitored substantially simultaneously.

16. The multi-channel wavelength monitor of claim 13 wherein at least one of the plurality of optical filters comprises a thin film filter.

17. The multi-channel wavelength monitor of claim 13 wherein the detector comprises a photodiode array.

18. The multi-channel wavelength monitor of claim 17 wherein the photodiode array is periodically spaced.

19. A method for simultaneously monitoring multiple wavelengths in a multi-channel optical beam, the method comprising:
   a) dispersing an optical beam into a plurality of optical beams propagating in a plurality of optical paths, wherein each of the plurality of optical beams has one of a plurality of wavelengths;
   b) transmitting the plurality of optical beams through an optical filter, wherein a respective one of a plurality of locations of the optical filter substantially transmits a respective one of the optical beams having a respective one of the plurality of wavelengths and substantially rejects other optical beams; and c) simultaneously detecting each of the plurality of transmitted optical beams and generating a plurality of electrical signals, a respective one of the plurality of electrical signals corresponding to an intensity of a respective one of the plurality of optical beams.

20. The method of claim 19 further comprising processing the electrical signals corresponding to the intensity of each of the transmitted optical signals to characterize the optical beam.

21. The method of claim 19 wherein the step of simultaneously detecting each of the plurality of transmitted optical beams comprises differentially detection the beams.

* * * * *